United States Patent
McCullough et al.

(10) Patent No.: US 11,036,921 B2
(45) Date of Patent: *Jun. 15, 2021

(54) SYSTEM, APPARATUS, AND METHOD FOR PAGE COMPOSITION

(71) Applicant: Groupon, Inc., Chicago, IL (US)

(72) Inventors: Sean McCullough, San Francisco, CA (US); Adam Geitgey, Mountain View, CA (US)

(73) Assignee: GROUPON, INC., Chicago, IL (US)

(*) Notice: Subject to any disclaimer, the term of this patent is extended or adjusted under 35 U.S.C. 154(b) by 72 days.

This patent is subject to a terminal disclaimer.

(21) Appl. No.: 16/270,722

(22) Filed: Feb. 8, 2019

(65) Prior Publication Data
US 2019/0278834 A1  Sep. 12, 2019

Related U.S. Application Data

(63) Continuation of application No. 14/809,777, filed on Jul. 27, 2015, now Pat. No. 10,241,981, which is a
(Continued)

(51) Int. Cl.
G06Q 30/02 (2012.01)
G06F 40/00 (2020.01)
(Continued)

(52) U.S. Cl.
CPC ............ *G06F 40/14* (2020.01); *G06F 16/958* (2019.01); *G06Q 30/0245* (2013.01);
(Continued)

(58) Field of Classification Search
CPC .......... G06Q 30/02–0277; G06F 40/14; G06F 16/958
See application file for complete search history.

(56) References Cited

U.S. PATENT DOCUMENTS

| | | |
|---|---|---|
| 8,355,948 B2 | 1/2013 | Mason |
| 9,633,217 B2 | 4/2017 | Potekhin et al. |
| 2013/0305045 A1 | 11/2013 | Potekhin et al. |

FOREIGN PATENT DOCUMENTS

WO   WO-9750238 A1 * 12/1997   ............ H04M 11/02

OTHER PUBLICATIONS

U.S. Patent Application filed Jun. 28, 2013; In re: Ayars et al., entitled Method and Apparatus for Generating an Electronic Communication, U.S. Appl. No. 13/930,519.
(Continued)

*Primary Examiner* — Raquel Alvarez
(74) *Attorney, Agent, or Firm* — Alston & Bird LLP

(57) ABSTRACT

A system and related devices and methods facilitating orchestration of page composition based on performance of one or more portions of the page are disclosed herein. An exemplary system may comprise a first device and a second device. An exemplary method may comprise providing to a client device, a first portion of a requested page while waiting for one or more service calls required to render a second portion to return, and after a time at which the one or more service calls required to render the second portion return, providing the client device with the second portion, the one or more service calls required to render the second portion having a higher latency than any service calls required to render the first portion.

15 Claims, 10 Drawing Sheets

Related U.S. Application Data continuation of application No. 14/575,396, filed on Dec. 18, 2014, now Pat. No. 9,141,593.

(60) Provisional application No. 61/919,288, filed on Dec. 20, 2013.

(51) Int. Cl.
*G06F 40/14* (2020.01)
*G06F 16/958* (2019.01)
*G06Q 30/06* (2012.01)

(52) U.S. Cl.
CPC ..... *G06Q 30/0251* (2013.01); *G06Q 30/0255* (2013.01); *G06Q 30/0269* (2013.01); *G06Q 30/0641* (2013.01)

(56) References Cited

OTHER PUBLICATIONS

U.S. Application filed Mar. 2, 2012; In re: O'Brien et al., entitled "Relevance System for Consumer Deals", U.S. Appl. No. 13/411,502.
U.S. Application filed Mar. 14, 2013; In re: Aggarwal et al., entitled "Promotion Offering System", U.S. Appl. No. 13/829,581.
Crosetto et al., Do consumers prefer offers that are easy to compare? An experimental investigation, Jena economic research papers, No. 2011, 044 https://www.econstor.eu/bitstream/10419/56852/1/670094900.pdf, (Year: 2011).

* cited by examiner

```html
<html>
<head>
<title>Groupon</title>
<link href="/style.css" rel="stylesheet">
<script src="/script.js" type="text/javascript"></script>
</head>
<body>
<div id="container">
<header id="global-nav">...</header>
<section id="deal-content">...</section>
<footer id="global-footer">...</footer>
</div>
</body>
</html>
```

SYSTEM, APPARATUS, AND METHOD FOR PAGE COMPOSITION

RELATED APPLICATIONS

This application is a continuation of U.S. application Ser. No. 14/809,777 titled "SYSTEM, APPARATUS, AND METHOD FOR PAGE COMPOSITION" filed Jul. 27, 2015, which is a continuation of U.S. application Ser. No. 14/575,396 titled "SYSTEM, APPARATUS, AND METHOD FOR PAGE COMPOSITION" filed on Dec. 18, 2014, now U.S. Pat. No. 9,141,593 issued Sep. 22, 2015, which claims priority to and the benefit of the filing date of U.S. Provisional Patent Application No. 61/919,288, titled "SYSTEM, APPARATUS, AND METHOD FOR PAGE COMPOSITION" filed on Dec. 20, 2013, which is hereby incorporated by reference in its entirety.

FIELD

Embodiments of the invention relate, generally, to providing a system, apparatus, and method for orchestrating page composition based on performance of one or more portions of the page.

BACKGROUND

Conventional display methods generally require consumer-specific information to be retrieved and then utilized in the generation of the content of a web page, or alternatively, a web page may be generated without personalization, thereby limiting the use of consumer-specific information or sacrificing time. In this regard, areas for improving current systems have been identified. Through applied effort, ingenuity, and innovation, solutions to improve such systems have been realized and are described in connection with embodiments of the present invention.

BRIEF SUMMARY

In general, embodiments of the present invention provided herein include systems, apparatuses, methods and computer readable media for providing prioritized rendering of a web page.

In some embodiments a method for programmatically orchestrating page composition based on individual performance of a return of service calls related to one or more portions of the page resulting in prioritized rendering of the page may be provided, the method comprising providing to a client device, a first portion of a requested page while waiting for one or more service calls required to render a second portion to return, after a time at which the one or more service calls required to render the second portion return, providing the client device with the second portion, the one or more service calls required to render the second portion having a higher latency than any service calls required to render the first portion.

In some embodiments, the method may further comprise receiving hyper-text markup language (HTML) information configured for providing the requested page, the HTML information comprising at least two parts, wherein one of the at least two parts is indicative of the first portion of the requested page and wherein one of the at least two parts is indicative of the second portion of the requested page. In some embodiments, each of the standalone parts comprised of associated performance characteristics. In some embodiments, the time at which the one or more service calls required to render the second portion is a function of the associated performance characteristics of the part indicative of the second portion.

In some embodiments, the method may further comprise subsequent to providing the first portion to a client device, providing a third portion of a requested page while waiting for one or more service calls required to render a second portion to return, a location of the third portion being dependent on the first portion. In some embodiments, the method may further comprise subsequent to providing the client device with the second portion, providing the client device with a third portion, one or more service calls required to render the third portion having a higher latency than the one or more service calls required to render the second portion. In some embodiments, the method may further comprise executing one or more service calls required to render the second portion, at least one of the service calls returning output of a relevance determination, the relevance determination comprising generating a ranking of promotions for presentation to a consumer, wherein each of the promotions is associated with attributes, and wherein the first ranking is generated based on correlating preferred attributes accessed from a consumer profile of the consumer to the attributes of each of the promotions, and generating a second ranking of promotions for presentation to the consumer, wherein the second ranking is generated based on the correlating the preferred attributes accessed from the consumer profile and information associated with the service call.

In some embodiments a method for programmatically providing a prioritized rendering of a requested page, the request page comprised of two or more portions may be provided, the method comprising receiving at a client device, a first portion of a requested page, displaying, utilizing a browser, the first portion, subsequent to the receiving of the first portion, receiving a second portion of the requested page, and displaying, utilizing the browser, the second portion, wherein the second portion is at least one of dependent on the first portion for location or comprises content which required one or more service calls, the one or more service calls required to render the second portion having a higher latency than any service calls required to render the first portion.

In some embodiments, the method may further comprise subsequent to the receiving of the second portion, receiving a third portion of the requested page, the third portion comprising content requiring one or more service calls, the one or more service calls required to render the third portion having a higher latency than the one or more service calls required to render the second portion.

In some embodiments a method for programmatically aiding in orchestration of page composition based on individual performance of a return of service calls related to one or more portions of the page resulting in prioritized rendering of the page may be provided, the method comprising receiving a first service call, from a web application, at a first service module, receiving a second service call, from the web application, at a second service module, the first service call and the second service call are received within a time window, providing a return to the first service call, wherein the second service call is received before the first service call is returned, and wherein the return to the first service call is provided after the time window.

In some embodiments a device for programmatically orchestrating page composition based on individual performance of service calls related to one or more portions of the page resulting in prioritized rendering of the page may be provided. The device may comprise a processor including one or more processing devices configured to perform independently or in tandem to execute hard-coded functions or execute software instructions; a user interface; a communications module; and a memory comprising one or more volatile or non-volatile electronic storage devices storing computer-readable instructions configured to programmatically orchestrate page composition based on individual performance of service calls related to the portions of a request page enabling prioritized rendering of the requested page, the computer-readable instructions being configured, when executed, to cause the processor to provide to a client device, a first portion of a requested page while waiting for one or more service calls required to render a second portion to return, after a time at which the one or more service calls required to render the second portion return, providing the client device with the second portion, the one or more service calls required to render the second portion having a higher latency than any service calls required to render the first portion.

In some embodiments, the memory stores computer-readable instructions that, when executed, cause the processor to receive hyper-text markup language (HTML) information configured for providing the requested page, the HTML information comprising at least two parts, wherein one of the at least two parts is indicative of the first portion of the requested page and wherein one of the at least two parts is indicative of the second portion of the requested page. In some embodiments, each of the standalone parts comprised of associated performance characteristics. In some embodiments, the time at which the one or more service calls required to render the second portion is a function of the associated performance characteristics of the part indicative of the second portion. In some embodiments, the memory stores computer-readable instructions that, when executed, cause the processor to, subsequent to providing the first portion to a client device, provide a third portion of a requested page while waiting for one or more service calls required to render a second portion to return, a location of the third portion being dependent on the first portion.

In some embodiments, the memory stores computer-readable instructions that, when executed, cause the processor to, subsequent to providing the client device with the second portion, provide the client device with a third portion, one or more service calls required to render the third portion having a higher latency than the one or more service calls required to render the second portion. In some embodiments, the memory stores computer-readable instructions that, when executed, cause the processor to execute one or more service calls required to render the second portion, at least one of the service calls returning output of a relevance determination, the relevance determination comprising generating a ranking of promotions for presentation to a consumer, wherein each of the promotions is associated with attributes, and wherein the first ranking is generated based on correlating preferred attributes accessed from a consumer profile of the consumer to the attributes of each of the promotions, and generating a second ranking of promotions for presentation to the consumer, wherein the second ranking is generated based on the correlating the preferred attributes accessed from the consumer profile and information associated with the service call.

In some embodiments a device for programmatically aiding in the orchestration of page composition based on individual performance of service calls related to one or more portions of the page resulting in prioritized rendering of the page may be provided, the device comprising a processor including one or more processing devices configured to perform independently or in tandem to execute hard-coded functions or execute software instructions; a user interface; a communications module; and a memory comprising one or more volatile or non-volatile electronic storage devices storing computer-readable instructions configured to programmatically provide a prioritized rendering of the requested page, the computer-readable instructions being configured, when executed, to cause the processor to receive at a client device, a first portion of the requested page, display, utilizing a browser, the first portion, subsequent to the receiving of the first portion, receive a second portion of the requested page, and display, utilizing the browser, the second portion, wherein the second portion is at least one of dependent on the first portion for location or comprises content which required one or more service calls, the one or more service calls required to render the second portion having a higher latency than any service calls required to render the first portion. In some embodiments, the memory stores computer-readable instructions that, when executed, cause the processor to, subsequent to the receiving of the second portion, receive a third portion of the requested page, the third portion comprising content requiring one or more service calls, the one or more service calls required to render the third portion having a higher latency than the one or more service calls required to render the second portion.

In some embodiments a device for programmatically aiding in the orchestration of page composition based on individual performance of service calls related to one or more portions of the page resulting in prioritized rendering of the page may be provided, the device comprising a processor including one or more processing devices configured to perform independently or in tandem to execute hard-coded functions or execute software instructions; a user interface; a communications module; and a memory comprising one or more volatile or non-volatile electronic storage devices storing computer-readable instructions configured to programmatically aiding in the orchestration of page composition based on individual performance of service calls related to the portions of a request page enabling prioritized rendering of the requested page, the computer-readable instructions being configured, when executed, to cause the processor to receive a first service call, from a web application, at a first service module, receive a second service call, from the web application, at a second service module, the first service call and the second service call are received within a time window, provide a return to the first service call, wherein the second service call is received before the first service call is returned, and wherein the return to the first service call is provided after the time window.

In some embodiments a computer program product configured for programmatically orchestrating page composition based on individual performance of a return of service calls related to one or more portions of the page resulting in prioritized rendering of the page may be provided, the computer program product comprising at least one computer-readable storage medium having computer-executable program code instructions stored therein, the computer-executable program code instructions comprising program code instructions for providing to a client device, a first portion of a requested page while waiting for one or more service calls required to render a second portion to return, after a time at which the one or more service calls required to render the second portion return, providing the client device with the second portion, the one or more service calls required to render the second portion having a higher latency than any service calls required to render the first portion.

In some embodiments, the computer-executable program code instructions further comprise program code instructions for receiving hyper-text markup language (HTML) information configured for providing the requested page, the HTML information comprising at least two parts, wherein one of the at least two parts is indicative of the first portion of the requested page and wherein one of the at least two parts is indicative of the second portion of the requested page. In some embodiments, each of the standalone parts comprised of associated performance characteristics. In some embodiments, the time at which the one or more service calls required to render the second portion is a function of the associated performance characteristics of the part indicative of the second portion.

In some embodiments, the computer-executable program code instructions further comprise program code instructions for subsequent to providing the first portion to a client device, providing a third portion of a requested page while waiting for one or more service calls required to render a second portion to return, a location of the third portion being dependent on the first portion. In some embodiments, the computer-executable program code instructions further comprise program code instructions for subsequent to providing the client device with the second portion, providing the client device with a third portion, one or more service calls required to render the third portion having a higher latency than the one or more service calls required to render the second portion.

In some embodiments, the computer-executable program code instructions further comprise program code instructions for executing one or more service calls required to render the second portion, at least one of the service calls returning output of a relevance determination, the relevance determination comprising generating a ranking of promotions for presentation to a consumer, wherein each of the promotions is associated with attributes, and wherein the first ranking is generated based on correlating preferred attributes accessed from a consumer profile of the consumer to the attributes of each of the promotions, and generating a second ranking of promotions for presentation to the consumer, wherein the second ranking is generated based on the correlating the preferred attributes accessed from the consumer profile and information associated with the service call.

In some embodiments a computer program product configured for programmatically providing a prioritized rendering of a requested page, the request page comprised of two or more portions may be provided, the computer program product comprising at least one computer-readable storage medium having computer-executable program code instructions stored therein, the computer-executable program code instructions comprising program code instructions for receiving at a client device, a first portion of a requested page, displaying, utilizing a browser, the first portion, subsequent to the receiving of the first portion, receiving a second portion of the requested page, and displaying, utilizing the browser, the second portion, wherein the second portion is at least one of dependent on the first portion for location or comprises content which required one or more service calls, the one or more service calls required to render the second portion having a higher latency than any service calls required to render the first portion.

In some embodiments, the computer-executable program code instructions further comprise program code instructions for subsequent to the receiving of the second portion, receiving a third portion of the requested page, the third portion comprising content requiring one or more service calls, the one or more service calls required to render the third portion having a higher latency than the one or more service calls required to render the second portion.

In some embodiments a computer program product configured for programmatically aiding in orchestration of page composition based on individual performance of a return of service calls related to one or more portions of the page resulting in prioritized rendering of the page may be provided, the computer program product comprising at least one computer-readable storage medium having computer-executable program code instructions stored therein, the computer-executable program code instructions comprising program code instructions for receiving a first service call, from a web application, at a first service module, receiving a second service call, from the web application, at a second service module, the first service call and the second service call are received within a time window, providing a return to the first service call, wherein the second service call is received before the first service call is returned, and wherein the return to the first service call is provided after the time window.

BRIEF DESCRIPTION OF THE DRAWINGS

Figure 1:
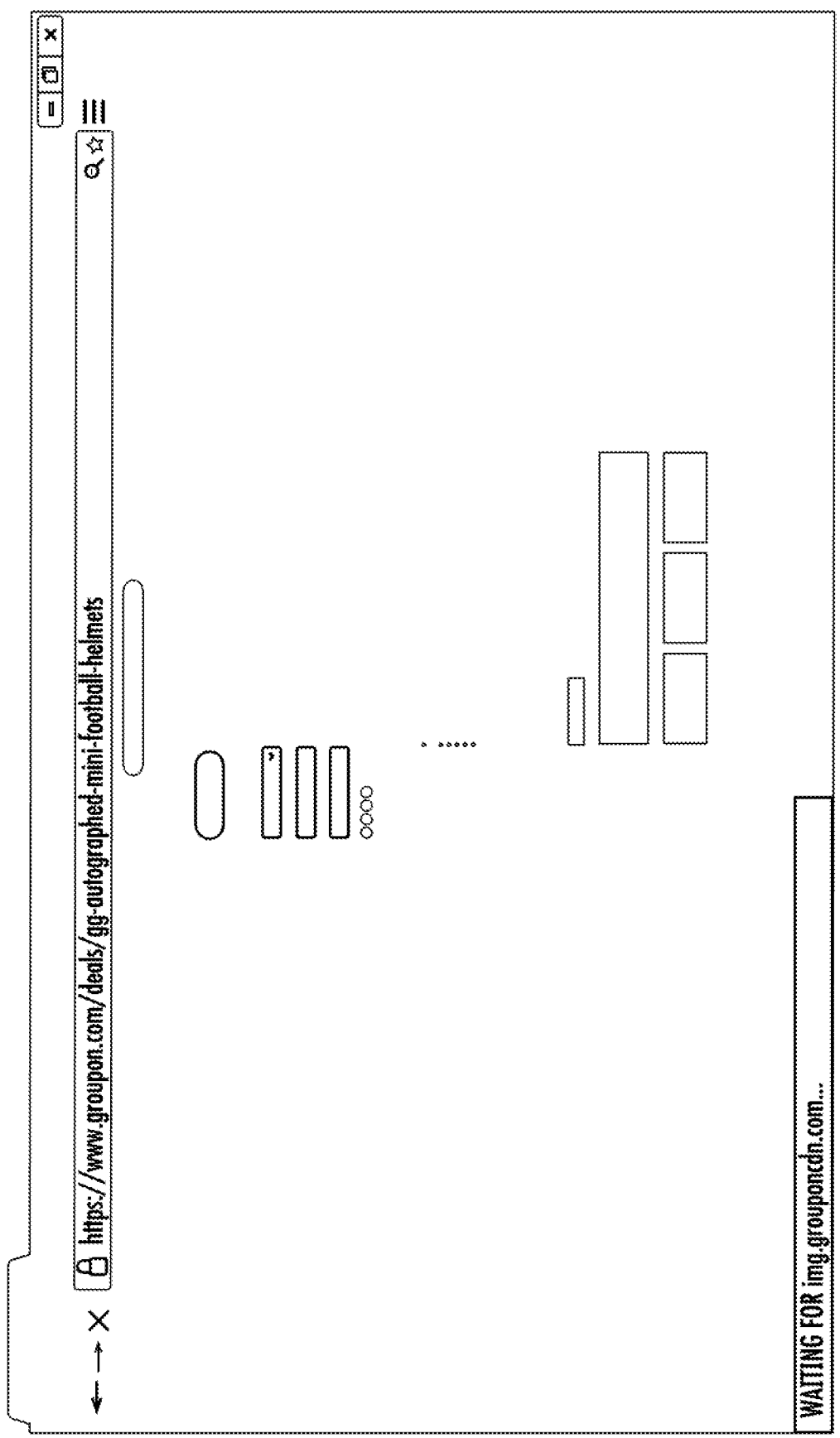
Figure 2:
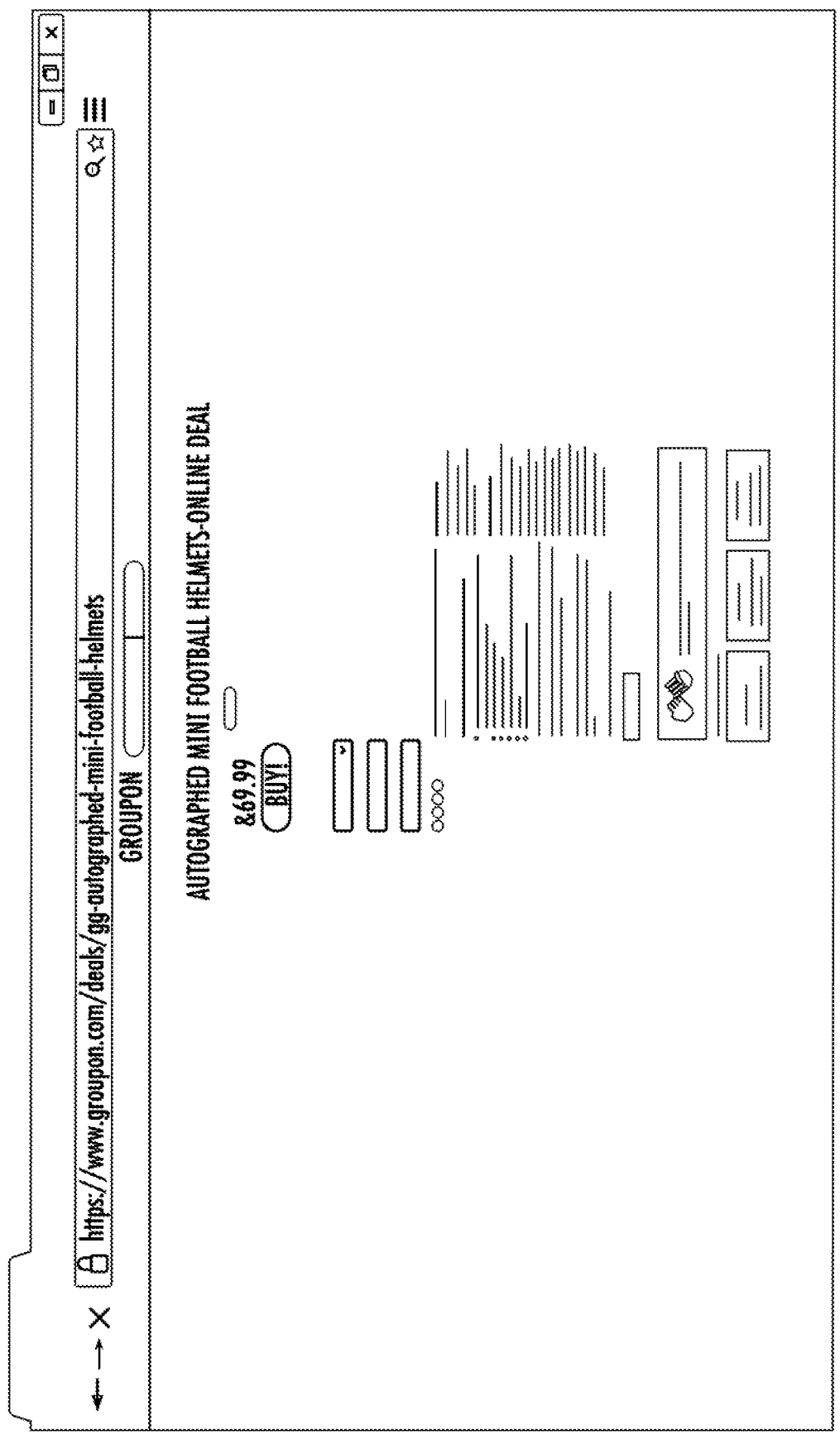
Figure 3:
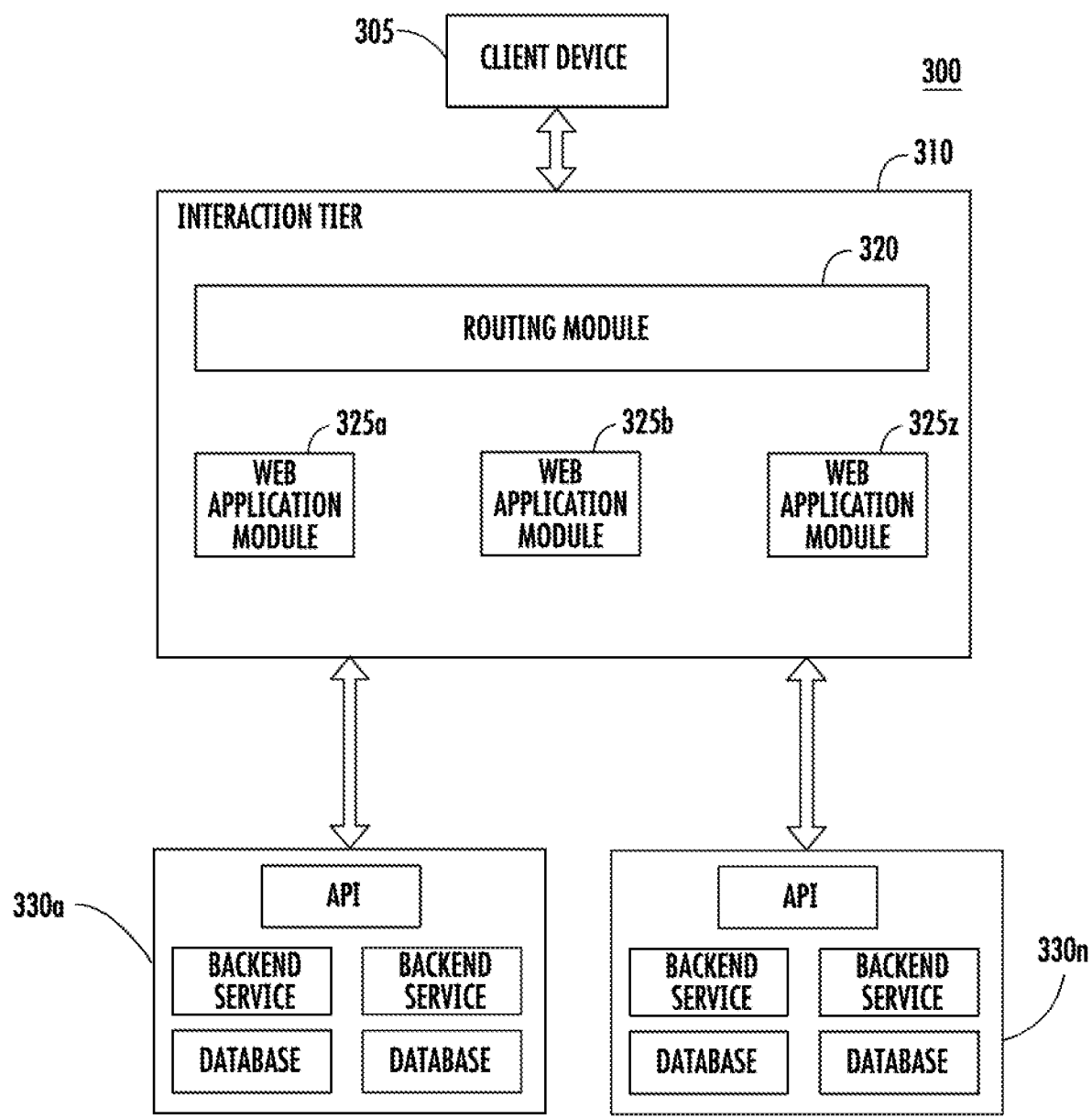
Figure 4:
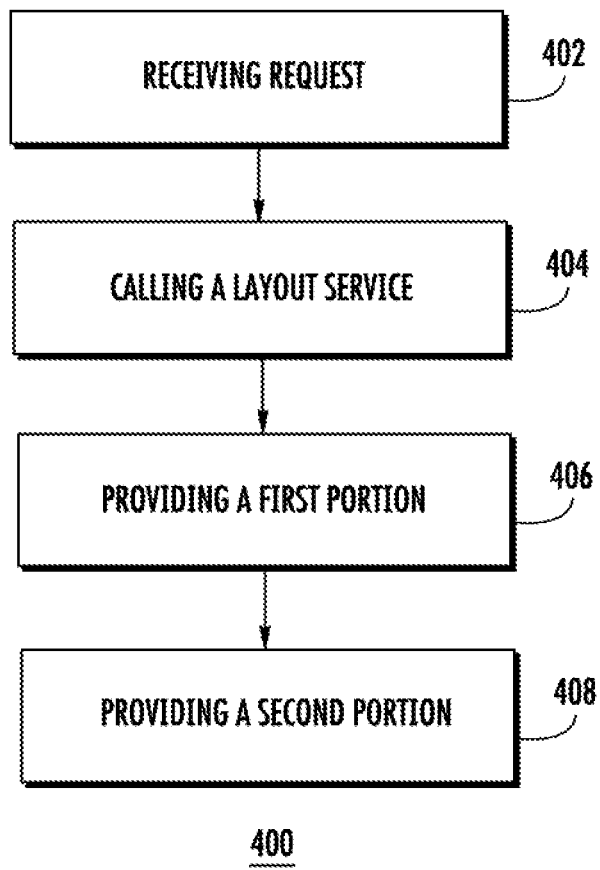
Figure 5:
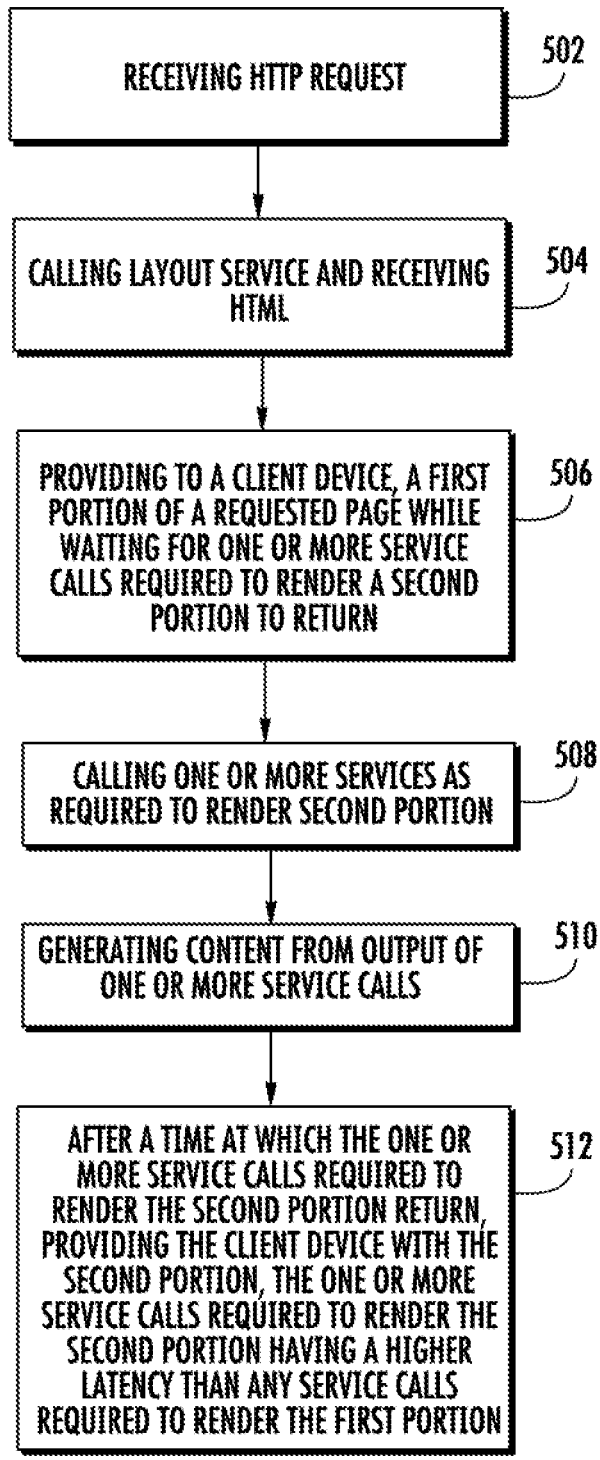
Figure 6:
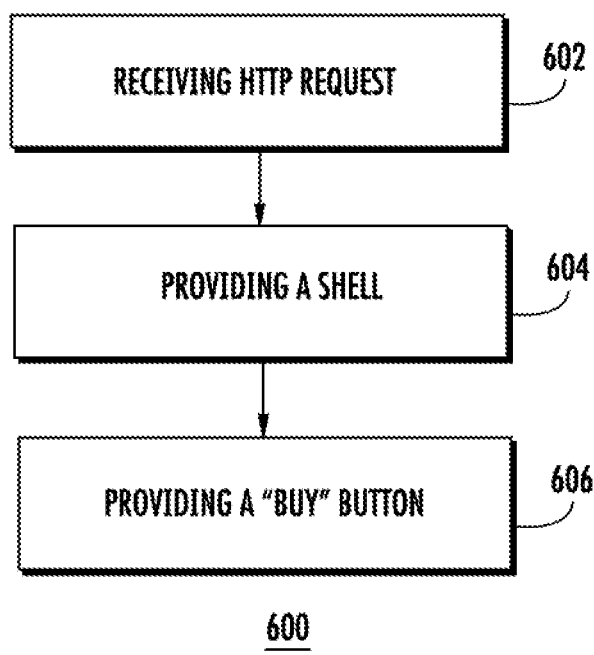
Figure 8:
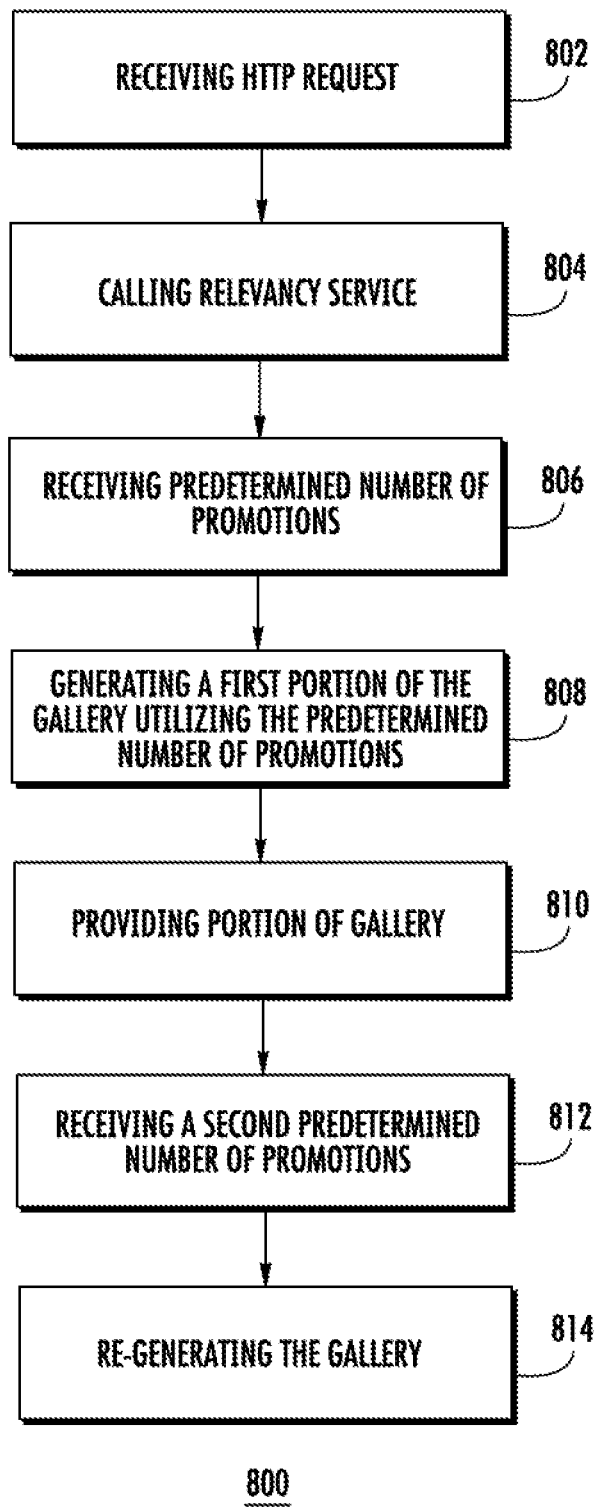
Figure 9:
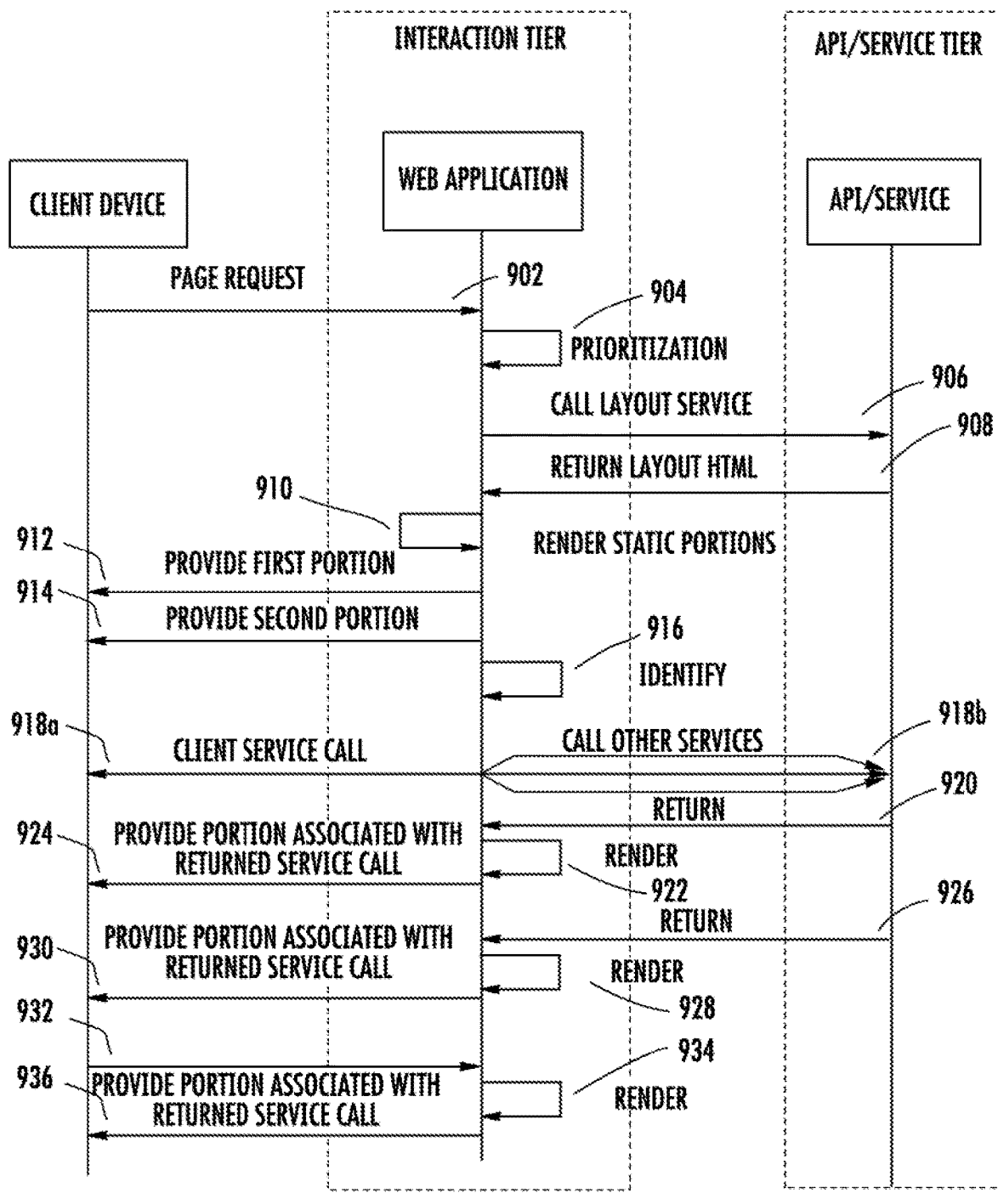
Figure 10:
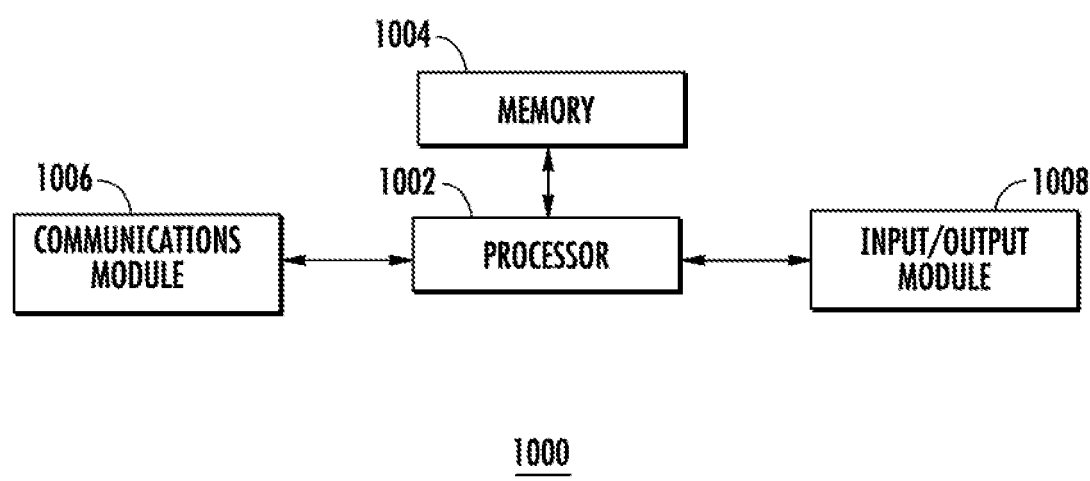

Having thus described some embodiments in general terms, reference will now be made to the accompanying drawings, which are not necessarily drawn to scale, and wherein:

FIGS. 1 and 2 show display screens of a web page during a loading process, configured in accordance with some embodiments;

FIG. 3 shows a flow chart of an example method, performed in accordance with some embodiments;

FIG. 4 shows a flow chart of an example method, performed in accordance with some embodiments;

FIG. 5 shows a flow chart of an example method, performed in accordance with some embodiments;

FIG. 6 shows a flow chart of an example method, performed in accordance with some embodiments;

FIG. 7 shows an exemplary HTML body in accordance with some embodiments;

FIG. 8 shows a flow chart of an example method, performed in accordance with some embodiments;

FIG. 9 shows a data flow diagram of an example method, performed in accordance with some embodiments; and FIG. 10 shows an example schematic block diagram of circuitry, configured in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Glossary

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

A "promotion and marketing service" may provide promotion and/or marketing services on behalf of one or more providers (e.g., one or more merchants, retailers, etc.) that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A "promotion" may be a deal purchased by a consumer from a promotional system, and may be considered an agreement for a particular provider to provide a service or good (e.g., a discounted service or good) to the consumer. A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion may be a deal offer whereby a running shoes company or intermediary (e.g., promotion provider) offers $50 of value toward the purchase of running shoes in exchange for $25. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running shoes company promotion as an example, the accepted value is $25 and the promotional value is $50. In this example, the residual value may be equal to the accepted value.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as an accepted value, a promotional value and/or a residual value. For example, using the aforementioned running shoes company as the example provider, an electronic indication in a mobile application that shows $50 of value to spend at the running shoes company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

A "provider" may be considered a merchant, retailer, or other provider of goods or services that offers a promotion, as agreed upon with the promotion and marketing service affiliated with the promotional system. A provider may include, but is not limited to, a merchant, business owner, consigner, shopkeeper, tradesperson, vender, operator, entrepreneur, agent, dealer, retailer, organization or the like that is in the business of a providing a good, service or experience to a consumer, facilitating the provision of a good, service or experience to a consumer and/or otherwise operating in the stream of commerce. For example, a provider may the form of a running shoes company that sells attire that is generally used by a person who runs or participates in athletic activities.

An "impression" may be considered a communication advertising an offer to purchase a promotion from a promotional system. An impression may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

Impressions are therefore provided to "consumers." Consumers include, but not limited to, a client, customer, purchaser, shopper, user of the promotional system or the like who may be in the position to or does exchange value for one or more instruments under the terms defined by the one or promotions. For example, and using the aforementioned running shoes company as the example provider, an individual who is interested in purchasing running shoes.

Embodiments provided herein may include a system that may be implemented to orchestrate page composition based on performance of one or more portions of the page. That is, a portion of a web page may be provided when service calls required to render the portion have returned. As such, a "page" may include a visual representation of document, written in, for example hyper-text markup language (HTML) or other markup language, and configured to be displayed on, for example, a monitor or the like. The HTML may be divided into "standalone parts" that may render individual "portions" of the page. Portions may be statically set or, in some embodiments, dynamically set. In some embodiments, a portion may comprise a "gallery" or a plural of portions may make up a "gallery." A "gallery" may be one or more, in some embodiments, related, objects. In some embodiments, a "gallery" may be configured to allow a consumer to view, organize, find, edit, print, send, or share the objects of the gallery. In the present case, the "gallery" may be comprised of promotions, goods, experiences, or the like.

Some embodiments described herein may include one or more methods for performing the functionality described herein and/or non-transitory computer readable media storing instructions for performing the one or more methods that are executable by a processor. Other embodiments may include machines, such as an apparatus and/or system, configured to implement the methods and/or other functionality discussed herein. For example, the machine may include one or more processors and/or other machine components configured to implement the functionality discussed herein based on instructions and/or other data stored in memory, circuitry, and/or non-transitory computer readable media.

These characteristics as well as additional features, functions, and details of various corresponding and additional embodiments are described below.

Brief Overview

The methods, apparatus and computer program products described herein may be configured to orchestrate page composition based on performance of one or more portions of the page. That is, a portion of a web page may be provided when service calls required to render the portion have returned. A page may be comprised of a plurality of portions, and composition of that page may be orchestrated in a manner in which portions of the page are rendered individually in a prioritized manner. In other words, when a consumer requests a page on a website of, for example, a promotion and marketing system, the page may be comprised of individual portions, and the individual portions may be provided when ready. For example, FIGS. 1 and 2 show display screens of a web page during a loading process. Specifically, in this exemplary embodiment, during page generation, a first portion (e.g., a layout or shell), which may be provided by a promotion and marketing system, is displayed first and a other information (e.g., a "buy" button), which may also be rendered and provided by a promotion and marketing system, is displayed after. Whereas in other examples, the other information, such as a "buy" button may be loaded first, prior to any other information to enable a consumer to purchase a promotion without waiting for other portions of the page to load.

Specifically, FIGS. 1 and 2 show example displays that may be presented by one or more display screens of one or more client devices (e.g., a computer monitor, laptop screen, a mobile telephone, "smart phone" or other device). Similar interfaces may be utilized with other types of devices discussed herein and modified accordingly (e.g., for screen size, input device compatibly, ease of use, etc.).

In various embodiments of the present invention, in order to achieve the prioritized rendering of individual portions of page, a system may be configured for providing portions of the requested page as soon as the information necessary to provide those portions is available. In other words, portions comprised of, for example, relatively static information and/or requiring no service calls (and hence having no latency) may be provided first, very quickly. Other portions, for example, those portions requiring consumer specific information (e.g., "you may also like") or dynamic information (e.g., the number of Facebook® likes a promotion may have) are provided after a service call requesting such information is returned.

The consumer specific portions may be populated with consumer associated content. In some embodiments, the consumer associated content may include one or more relevant promotions. In some embodiments, the host system may be configured such that particular promotions may be offered to consumers based on relevance determinations. Using consumer profile data or the like, intelligent selection or ranking of promotions to present to the consumer is enabled. For example, a promotion offering system may utilize one or more of promotion attributes, consumer attributes, promotion categories/sub-categories, consumer profile data, and the like, and in so doing, the consumer may be provided promotions more relevant more likely to be interested in the presented promotions.

In each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference in its entirety, algorithms are provided for matching consumers to relevant promotions.

An advantage that may be realized by some example embodiments discussed herein allows for prioritized provision of individual portions of a requested page. As such, the important portions of a requested page are delivered more quickly, such as the "buy" button.

Another advantage that may be realized herein allows for a system where one or more portions of a page are prioritized over other portions. In particular, a portion allowing a consumer to buy a promotion may be prioritized over a different portion. For example, when a consumer navigates a website of a promotion and marketing system, finds a promotion of interest, and clicks, or otherwise provides an indication to navigate to a page related to the promotion, portions of the page related to the ability to buy the promotion may be determined to be more important than other portions of the page, which may related to, for example, similar promotions (e.g., by category, sub-category, location, or the like).

Another advantage that may be realized herein allows for a system where pages are rendered server side. As such, search engine crawlers see the content of each page when they arrive. Instant search engine optimization (SEO) increases which may result in an increase in organic traffic to the page. Other advantages that may be realized by some example embodiments discussed herein are increased responsive to change, increased operational speed, flexibility and efficiency, shortened development time of new features (e.g., one software to write, as opposed to writing web app and then mobile app).

In yet further examples, the example system described herein may be configured to load a gallery or multi-widget web page. For example, a page displaying promotion and non-promotion content. In some examples, the promotion content may include a plurality of promotions being offered via the promotion and marketing service. In the case of the gallery page, each screen area, widget or the like may be individually loaded in an instance in which a service call is returned. In some examples, the loading may occur dynamically based on a determined relevance to a consumer, a consumer ranking, and/or the like. Some example embodiments for selecting, assigning, and utilizing content generators with respect loading a gallery, multi-widget web page or the like are described further in co-pending U.S. patent application Ser. No. 13/930,519, filed Jun. 28, 2013 and entitled "Method And Apparatus For Generating An Electronic Communication," which is herein incorporated by reference in its entirety.

Example System Architecture

FIG. 1 is a block diagram showing an exemplary system 300 for a system that enables page generation based on performance of one or more portions of the page. The system 300 may be configured to include a client device 305, an interaction tier 310, and a backend modules 330a-330n comprising at least one or more APIs and/or services. The client device 305, as described above may be a mobile phone, personal computer, tablet, mobile device or the like, and may be configured to store and run a browser. The browser may be configured to display one or more impressions, promotions, or the like.

The system 300 may be further configured to include an interaction tier 310. The interaction tier 310 may be configured to receive a request (e.g., an http request) from the client device via a client delivery network. Once the request is received, the request may be routed via the routing module 320, to the requested page (e.g., web application). The requested pages 325a, 325b, and 330z may be implemented as web applications. For example, first page 330a may be a promotions application, which may be called when a consumer, using the client device, visits a website associated with a promotion and marketing system.

The system may 300 may be further configured to include a plurality of application program interfaces (APIs) 330a-330n. An exemplary API 330a may comprise one or more backend services and databases.

High Level Exemplary Process

FIG. 4 shows an example process where an application receives an http request from a client device and orchestrates page (e.g., a web page) composition in return. The exemplary process shown below allow various embodiments of the present invention to provide a first portion of a requested page while waiting for, for example, one or more service calls required to render a second portion to return thus providing the client device with particular parts of the webpage without having to wait for those parts having higher latency.

As shown in block 402 of FIG. 4, an apparatus, such as web application module 325a, may be configured for receiving a HTTP request or the like from a client device 305 via routing module 320. For example, a consumer may open a web browser on their home computer, tablet, or mobile phone and direct the browser to a web page associated with the promotion and marketing service. In some example embodiments, each of web application module 325a, 325b, and 325z may be configured to provide a page of a website associated with the promotion and marketing system. For example, web application module 325a may be configured to provide a promotions page.

As shown in block 404 of FIG. 4, an apparatus, such as web application module 325a, may be configured for calling one or more services. For example, because the web application module may have no persistence and/or no data storage module, the web application module may call a layout service to provide, for example, HTML configured for providing the requested page. In some embodiments, the HTML may comprise standalone parts, each standalone part representing a portion of the requested page. Each standalone part may be further configured to be provided to a browser at an associated time. Each standalone part may comprise associated performance characteristics.

In other words, after block 404, the web application module 325a has HTML configured for providing the requested page. That HTML may be comprised of standalone parts as described above. One or more of the standalone parts may require service calls for rendering the portion of the page it represents. One or more standalone parts may require a different standalone part to be rendered before it may be rendered (e.g., location dependent).

As shown in block 406 of FIG. 4, an apparatus, such as web application module 325a, may then be configured for providing a first portion of the requested page. In some embodiments, a designation such as "first", "second", "next", "after" or the like may be a function of prioritization or latency. For example, a shell may be designated as the "first" portion as it may be necessary in order to provide locations for each of one or more subsequent portions. In some embodiments, the designations described above may be a function of one or more performance characteristics of a standalone part of the HTML. For example, a standalone part having no latency may be rendered and provided to the client device without having to wait on output from a service call or the like.

Once the first portion of the requested page is provided, as shown in block 408 of FIG. 4, an apparatus, such as web application module 325a, may then be configured for providing a second portion. In some embodiments, the second portion may be provided when each of one or more service calls required to render the second portion have returned. For example, if the second portion comprises consumer specific data, the web application module 325a may be configured for calling one or more services required to render the second portion and wait until each of the service calls have returned.

Page Composition Process

FIGS. 5 and 6 show an example processes where an application receives an http request from a client device and orchestrates page (e.g., a web page) composition in response. In FIG. 5, an exemplary process is shown where a second portion of a, for example, promotion page, having higher latency service calls are provided after a first portion. In FIG. 6, an exemplary process is shown in which a second portion of the requested page, for example a gallery page, may depend on a location of the first portion and, thus, may be provided afterward.

Returning to FIG. 5, an exemplary process is shown for allowing various embodiments of the present invention to first provide portions of a requested page which do not require data with a high latency while remaining portions of the requested page are still rendering thus providing the client device with particular parts of the webpage without having to wait for those parts having higher latency.

As shown in block 502 of FIG. 5, an apparatus, such as web application module 325a, may be configured for receiving a HTTP request or the like from a client device 305a via routing module 320. Again, as described above, a consumer may open a web browser on their home computer, tablet, or mobile phone and direct the browser to a web page associated with the promotion and marketing service.

As shown in block 504 of FIG. 5, an apparatus, such as web application module 325*a*, may be configured for calling a layout service and receiving html configure for providing the requested page. As shown in block 506 of FIG. 5, an apparatus, such as web application module 325*a*, may be configured for splitting the HTML according to standalone parts of the HTML, the standalone parts indicated by division tags or the like. FIG. 7 shows an exemplary HTML body comprising <div id="container"> and </div> which may be used to indicate standalone parts of the HTML. For example, in some embodiments, the web application module may be provided with <html> to <div id="container">, then from </div> to </html>. The web application module may then split the code shown in FIG. 7, and provide the top part down to the client very quickly. The layout service may host the <header> and <footer> as separate endpoints as each may require consumer specific data, which may have some latency in rendering. The web application module may then generate the content in the <section> based off the output of a few service calls.

As such, as shown in block 506 of FIG. 5, an apparatus, such as web application module 325*a*, may be configured for providing a first portion to the client device. For example, as shown above, the HTML is split and a first portion (e.g., from <html> to <div id="container">) may be provided as a first portion. Then, as shown in block 508 of FIG. 5, an apparatus, such as web application module 325*a*, may be configured for calling one or more services as required to render second portion. As such, as shown in block 510 of FIG. 5, an apparatus, such as web application module 325*a*, may be configured for generating content from output of one or more service calls. As described previously, in some embodiments, portions requiring content may be consumer specific portions, and as such, may be populated with consumer associated content. In some embodiments, the consumer associated content may include one or more relevant promotions.

In some embodiments, the apparatus may be further configured for executing one or more service calls required to render the second portion, at least one of the service calls returning output of a relevance determination. The relevance determination may comprise generating a ranking of promotions for presentation to a consumer, wherein each of the promotions is associated with attributes, and wherein the first ranking is generated based on correlating preferred attributes accessed from a consumer profile of the consumer to the attributes of each of the promotions. The relevance determination may further comprise generating a second ranking of promotions for presentation to the consumer, wherein the second ranking is generated based on the correlating the preferred attributes accessed from the consumer profile and information associated with the service call. In other words, the second ranking may be a function of which specific web application module calls. For example, the web application module may provide identification, such as a "promotions" web application module, a "experiences" application module, a "getaways" web application module. As such, the relevance service may provide output accordingly. In further embodiments, the web application module may further provide additional information, such as a category, sub-category, location or the like.

As shown in block 512 of FIG. 5, an apparatus, such as web application module 325*a*, may be configured for providing a second portion once each of the service calls required to render the second portion have returned. In some embodiments, a plurality of portions may each require one or more service calls. In some embodiments, the web application module utilizes non-blocking calls such that each call may be made before a previous call has returned. As such, a standalone part of the HTML having a low latency may be able to be rendered before a different standalone part of the HTML, and accordingly, may be provided first.

Turning to FIG. 6, an exemplary process is shown in which a second portion of the requested page, for example, a buy button in relation to a shell or a subsequent promotion in a gallery in relation to a previous promotion, may depend on a location of the first portion and, thus, may be provided afterward. In various embodiments, the process of FIG. 6 may be used in conjunction with, for example, parallel to, preceding or subsequent to FIG. 5. The exemplary process shown in FIG. 6 may be provided such that, in various embodiments of the present invention.

As shown in block 602 of FIG. 6, an apparatus, such as web application module 325*a*, may be configured for receiving an HTTP request. Then, as shown in block 604 of FIG. 6, an apparatus, such as web application module 325*a*, may be configured for providing a first portion, such as, for example, a shell, to a client device. As shown in block 606 of FIG. 6, an apparatus, such as web application module 325*a*, may be configured for then providing a second portion, such as for example, a "buy" button or the like, the location of which is dependent on its assigned position in the shell. In other embodiments, a plurality of portions are dependent on their assigned position in the shell.

Gallery Rendering

FIG. 8 shows an example process for providing a gallery as a portion of a requested page. The exemplary process shown below allows for various embodiments of the present invention to provide a first portion of a gallery while waiting for, for example, further calculations or ranking to finish. That is, in some embodiments, the web application module may be configured to call a relevancy service which provides a ranking of promotions for the gallery. The web application module may be configured such that the promotions are provided as they are returned or after a predetermined number of promotions are returned, each subsequent promotion provided based on the location of the preceding promotion.

As shown in block 802 of FIG. 8, an apparatus, such as web application module 325*a*, may be configured for receiving a HTTP request or the like from a client device 305 via routing module 320. Then, as shown in block 804 of FIG. 8, an apparatus, such as web application module 325*a*, may be configured for calling a relevancy service.

As shown in block 806 of FIG. 8, an apparatus, such as web application module 325*a*, may be configured for receiving promotions. In some embodiments, after a predetermined number of promotions are returned, as shown in block 808 of FIG. 8, an apparatus, such as web application module 325*a*, may be configured for generating a first portion of the gallery utilizing the predetermined number of promotions. As shown in block 810 of FIG. 8, an apparatus, such as web application module 325*a*, may be configured for providing the first portion of the gallery.

The relevancy may continue to return results. After a second predetermined number of promotions, the gallery may be re-generated and provided to the client device. As shown in block 812 of FIG. 8, an apparatus, such as web application module 325*a*, may be configured for receiving a second predetermined number of promotions. Then, as shown in block 814 of FIG. 8, an apparatus, such as web application module 325a, may be configured for re-generating the gallery and provided the re-generated gallery to the client device. In some embodiments, the promotions received subsequent to the first rendering of the gallery, may be provided in a second portion. In other embodiments, the entire gallery may be re-generated utilizing each of the received promotions.

In another example embodiment of the present invention, a second portion may be dependent on the content of the first portion. For example, the second portion labeled "you may also like" or "others have also viewed" or the like. Those portions utilize content of the first portion for the second portion. As such, those portions may be provided after a first portion.

Page Composition Data Flow

In some embodiments, in order to generate a requested page, a series of data flow operations may be performed which the appropriate web application to make a number of non-blocking service calls and provide portions of the requested page as the one or more service calls required to render them return. FIG. 9 shows a data flow diagram of an example data flow represented by method 900, which can result in providing a requested page to a client device portion by portion, performed in accordance with some embodiments.

At 902, a page request is sent from the client device to the interaction tier. The interaction tier may first route the page request to an appropriate web application. For example, if the requested page is a promotions page, the request may be routed to a web application configured to provide a promotions page. At 904, the web application may perform a prioritization, such as for example, determining an order in which portions of the page may be returned. In some embodiments, as shown at 906, a layout service may be called. At 908, HTML or, in some embodiments, a different markup language, may be returned. One or more static portions may be rendered at 910 and a first portion may be provided to the client device at 912. At 914, a second portion may be provided. The determination to provide the first portion followed by the second portion may be a function of a prioritization in the web application, the second portion's dependence on the first portion for location or the like, or due to the first portion having less latency in rendering.

At 916, the web application may identify or otherwise prioritize the standalone parts of the HTML. At 918a, a service call may be made configured to return client side information. At 918b, which may happen in parallel to or, in some embodiments, subsequent to or preceding 918a, one or more service calls are made to one or more services. At a high level, the order of the process now depends on the latency of each service call. As each of one or more service calls required to render each portion of the request page are returned, the portion may be rendered and/or provided.

As such, at 920, a service call is returned, and in an instance in which, the service call allows a portion to be rendered, a portion is then rendered as shown at 922. At 924, the portion may then be provided to the client device. Similarly, at 926, a different service call may be returned. At 928, an associated portion may then be rendered, and as shown at 930, the portion associated with the rendering may be provided. At 932, the service call configured to return client device information returns. At 934, a portion may then be rendered based on the return of that service call and, as shown at 936, an associated portion may be provided to the client device.

Exemplary System Architecture

FIG. 10 shows a schematic block diagram of circuitry 1000, some or all of which may be included in, for example, the client device 305, the routing module 320, web application modules 325a-325z, or backend modules 330a-330n. In accordance with some example embodiments, circuitry 1000 may include various means, such as one or more processors 1002, memories 1004, communications modules 1006, and/or input/output modules 1008.

As referred to herein, "module" includes hardware, software and/or firmware configured to perform one or more particular functions. In this regard, the means of circuitry 1000 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 1004) that is executable by a suitably configured processing device (e.g., processor 1002), or some combination thereof.

Processor 1002 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 10 as a single processor, in some embodiments, processor 1002 comprises a plurality of processors. The plurality of processors may be embodied on a single computing device or may be distributed across a plurality of computing devices collectively configured to function as circuitry 1000. The plurality of processors may be in operative communication with each other and may be collectively configured to perform one or more functionalities of circuitry 1000 as described herein. In an example embodiment, processor 1002 is configured to execute instructions stored in memory 1004 or otherwise accessible to processor 1002. These instructions, when executed by processor 1002, may cause circuitry 1000 to perform one or more of the functionalities of circuitry 1000 as described herein.

Whether configured by hardware, firmware/software methods, or by a combination thereof, processor 1002 may comprise an entity capable of performing operations according to embodiments of the present invention while configured accordingly. Thus, for example, when processor 1002 is embodied as an ASIC, FPGA or the like, processor 1002 may comprise specifically configured hardware for conducting one or more operations described herein. As another example, when processor 1002 is embodied as an executor of instructions, such as may be stored in memory 1004, the instructions may specifically configure processor 1002 to perform one or more algorithms and operations described herein.

Memory 1004 may comprise, for example, volatile memory, non-volatile memory, or some combination thereof. Although illustrated in FIG. 10 as a single memory, memory 1004 may comprise a plurality of memory components. The plurality of memory components may be embodied on a single computing device or distributed across a plurality of computing devices. In various embodiments, memory 1004 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1004 may be configured to store information, data, applications, instructions, or the like for enabling circuitry 1000 to carry out various functions in accordance with example embodiments discussed herein. For example, in at least some embodiments, memory 1004 is configured to buffer input data for processing by processor 1002. Additionally or alternatively, in at least some embodiments, memory 1004 may be configured to store program instructions for execution by processor 1002. Memory 1004 may store information in the form of static and/or dynamic information. This stored information may be stored and/or used by circuitry 1000 during the course of performing its functionalities.

Communications module 1006 may be embodied as any device or means embodied in circuitry, hardware, a computer program product comprising computer readable program instructions stored on a computer readable medium (e.g., memory 1004) and executed by a processing device (e.g., processor 1002), or a combination thereof that is configured to receive and/or transmit data from/to another device, such as, for example, a second circuitry 1000 and/or the like. In some embodiments, communications module 1006 (like other components discussed herein) can be at least partially embodied as or otherwise controlled by processor 1002. In this regard, communications module 1006 may be in communication with processor 1002, such as via a bus. Communications module 1006 may include, for example, an antenna, a transmitter, a receiver, a transceiver, network interface card and/or supporting hardware and/or firmware/software for enabling communications with another computing device. Communications module 1006 may be configured to receive and/or transmit any data that may be stored by memory 1004 using any protocol that may be used for communications between computing devices. Communications module 1006 may additionally or alternatively be in communication with the memory 1004, input/output module 1008 and/or any other component of circuitry 1000, such as via a bus.

Input/output module 1008 may be in communication with processor 1002 to receive an indication of a user input and/or to provide an audible, visual, mechanical, or other output to a user. Some example visual outputs that may be provided to a user by circuitry 1000 are discussed in connection with the displays described above. As such, input/output module 1008 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 1000 is embodied as a server or database, aspects of input/output module 1008 may be reduced as compared to embodiments where circuitry 1000 is implemented as an end-user machine (e.g., client) or other type of device designed for complex user interactions. In some embodiments (like other components discussed herein), input/output module 1008 may even be eliminated from circuitry 1000. Alternatively, such as in embodiments wherein circuitry 1000 is embodied as a server or database, at least some aspects of input/output module 1008 may be embodied on an apparatus used by a user that is in communication with circuitry 1000, such as for example, client device 305. Input/output module 1008 may be in communication with memory 1004, communications module 1006, and/or any other component(s), such as via a bus. Although more than one input/output module and/or other component can be included in circuitry 1000, only one is shown in FIG. 10 to avoid overcomplicating the drawing (like the other components discussed herein).

A non-transitory computer readable storage media can be configured to store firmware, one or more application programs, and/or other software, which include instructions and other computer-readable program code portions that can be executed to control processors of the components of system 1000 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein.

It is also noted that all or some of the information presented by the example displays discussed herein can be based on data that is received, generated and/or maintained by one or more components of client device 305. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. Each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1002 and/or payment/redemption module 1010 discussed above with reference to FIG. 10, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 1004) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for programmatically orchestrating page composition based on individual performance of a return of service calls related to one or more portions of the page resulting in prioritized rendering of the page, the method comprising:
   receiving, via a communication module, from a client device, a page request;
   calling a layout service to provide hyper-text markup language (HTML) information configured for providing the requested page, the HTML information comprising at least three parts, wherein one of the at least three parts is indicative of a first portion of the requested page, one of the at least three parts is indicative of a second portion of the requested page, one of the at least three parts is indicative of a third portion of the requested page,
   wherein each of the at least three parts configured to be provided to a browser of the client device at a different associated time;
   providing, via the communication module to the client device, the first portion of the requested page while waiting for one or more service calls required to render the second portion to return;
   subsequent to providing, via the communication module to the client device, the first portion of the requested page and prior to one or more service calls required to render the second portion being returned, receiving, via the communication module, the HTML information configured for providing the third portion of the requested page;
   waiting for the one or more service calls required to render the second portion to return;
   after a time at which the one or more service calls required to render the second portion return, providing, via the communication module, the client device with the second portion, the one or more service calls required to render the second portion having a higher latency than any service calls required to render the first portion; and
   providing, via the communication module, the client device with the third portion of the requested page, the third portion being provided after the second portion due to a dependency designation.

2. The method according to claim 1, wherein each of the at least three parts comprised of associated performance characteristics.

3. The method according to claim 2, wherein the time at which the one or more service calls required to render the second portion is a function of the associated performance characteristics of the part indicative of the second portion.

4. The method according to claim 1, wherein
   a location of the third portion is dependent on the first portion.

5. The method according to claim 1, wherein
   one or more service calls required to render the third portion having a higher latency than the one or more service calls required to render the second portion.

6. A device for programmatically orchestrating page composition based on individual performance of service calls related to one or more portions of the page resulting in prioritized rendering of the page, the device comprising:
   a processor including one or more processing devices configured to perform independently or in tandem to execute hard-coded functions or execute software instructions;
   a user interface;
   a communications module; and
   a memory comprising one or more volatile or non-volatile electronic storage devices storing computer-readable instructions configured to programmatically orchestrate page composition based on individual performance of service calls related to the portions of a requested page enabling prioritized rendering of the requested page, the computer-readable instructions being configured, when executed, to cause the processor to:
   receive, via a communication module, from a client device, a page request;
   call a layout service to provide hyper-text markup language (HTML) information configured for providing the requested page, the HTML information comprising at least three parts, wherein one of the at least three parts is indicative of a first portion of the requested page, one of the at least three parts is indicative of a second portion of the requested page, one of the at least three parts is indicative of a third portion of the requested page,
   wherein each of the at least three parts configured to be provided to a browser of the client device at a different associated time;
   provide to the client device, the first portion of the requested page while waiting for one or more service calls required to render the second portion to return;
   subsequent to providing, via the communication module to the client device, the first portion of the requested page and prior to one or more service calls required to render the second portion being returned, receive, via the communication module, the HTML, information configured for providing the third portion of the requested page;

wait for the one or more service calls required to render the second portion to return;

after a time at which the one or more service calls required to render the second portion return, provide the client device with the second portion, the one or more service calls required to render the second portion having a higher latency than any service calls required to render the first portion; and provide, via the communication module, the client device with the third portion of the requested page, the third portion being provided after the second portion due to a dependency designation.

7. The device according to claim 6, wherein each of the at least three parts comprised of associated performance characteristics.

8. The device according to claim 7, wherein the time at which the one or more service calls required to render the second portion is a function of the associated performance characteristics of the part indicative of the second portion.

9. The device of claim 6, wherein
a location of the third portion is dependent on the first portion.

10. The device of claim 6, wherein
one or more service calls required to render the third portion having a higher latency than the one or more service calls required to render the second portion.

11. A computer program product configured for programmatically orchestrating page composition based on individual performance of a return of service calls related to one or more portions of the page resulting in prioritized rendering of the page, the computer program product comprising at least one non-transitory computer-readable storage medium having computer-executable program code instructions stored therein, the computer-executable program code instructions comprising program code instructions for:

receiving, via a communication module, from a client device, a page request;

calling a layout service to provide hyper-text markup language (HTML) information configured for providing the requested page, the HTML information comprising at least three parts, wherein one of the at least three parts is indicative of a first portion of the requested page, one of the at least three parts is indicative of a second portion of the requested page, one of the at least three parts is indicative of a third portion of the requested page, wherein each of the at least three parts configured to be provided to a browser of the client device at a different associated time;

providing, via the communication module to the client device, the first portion of the requested page while waiting for one or more service calls required to render the second portion to return;

subsequent to providing, via the communication module to the client device, the first portion of the requested page and prior to one or more service calls required to render the second portion being returned, receiving, via the communication module, the HTML, information configured for providing the third portion of the requested page;

waiting for the one or more service calls required to render the second portion to return;

after a time at which the one or more service calls required to render the second portion return, providing, via the communication module, the client device with the second portion, the one or more service calls required to render the second portion having a higher latency than any service calls required to render the first portion; and providing, via the communication module, the client device with the third portion of the requested page, the third portion being provided after the second portion due to a dependency designation.

12. The computer program product according to claim 11, wherein each of the at least three parts comprised of associated performance characteristics.

13. The computer program product according to claim 12, wherein the time at which the one or more service calls required to render the second portion is a function of the associated performance characteristics of the part indicative of the second portion.

14. The computer program product according to claim 11, wherein
a location of the third portion is dependent on the first portion.

15. The computer program product according to claim 11, wherein
one or more service calls required to render the third portion having a higher latency than the one or more service calls required to render the second portion.

* * * * *